Oct. 20, 1942.     J. R. PIERCE     2,299,252
FREQUENCY DETECTOR
Filed May 29, 1941

INVENTOR
J. R. PIERCE
BY
George C. Ford
ATTORNEY

Patented Oct. 20, 1942

2,299,252

UNITED STATES PATENT OFFICE 2,299,252

FREQUENCY DETECTOR

John R. Pierce, New York, N. Y., assignor to Bell Telephone Laboratories, Incorporated, New York, N. Y., a corporation of New York Application May 29, 1941, Serial No. 395,764

6 Claims. (Cl. 250—27)

This invention relates to frequency detectors of the so-called cycle counter type, particularly as adapted for measuring frequencies or for detecting frequency modulated waves.

In the cycle counter type of frequency detector, a condenser is charged to a fixed voltage and discharged through an output circuit once during each cycle of the input oscillations applied thereto. As a result, the average current flowing in the output circuit is proportional to the input frequency and its amplitude will be a measure of the frequency of the input. Because of this characteristic such circuits are well adapted not only for frequency measuring but also for the detection of frequency modulated waves.

An object of the invention is to provide a frequency detector of the cycle counter type that will operate over a wide range of frequencies and particularly at high frequencies of the order of several megacycles.

In the cycle counters of the prior art adapted for operating at high frequencies, the charging and discharging of the capacitance circuits are controlled by electron discharge tubes. As a result the rather large cathode-to-ground capacitance of at least one tube appears in the capacitance branch. Since the upper limiting frequency of operation is determined by the time constant of this branch, there is an inherent frequency limit determined by this natural capacitance.

In accordance with a feature of the present invention one branch of the circuit employs an electron tube of the secondary emission type. With this arrangement the capacitance of the plate-to-ground rather than of the cathode-to-ground is effective in determining the limiting frequency of operation. Since the plate-to-ground capacitance of the tube is inherently considerably lower than the cathode-to-ground capacitance such a circuit can readily be operated at much higher frequencies up to several megacycles.

More specifically, the frequency detector of this invention comprises an electron discharge tube of the direct emission type and an electron discharge tube of the secondary emission type, arranged in a circuit in which the cathode-plate path of the first tube is in series with the secondary emission path of the second tube, the plates being connected together. The tubes are controlled so that the path of one tube is conducting during one half of the input cycle while the path of the other is substantially blocked and the opposition conditions are established during the other half cycle. As a result, a charge will accumulate at the point of connection of the plates of the tube during one half cycle and be discharged during the opposite half cycle. This produces an average current in the circuit which is directly proportional to the product of the frequency of the input, the combined plate-to-ground capacitances of the two tubes and the voltage applied to the circuit, and from this current there may be derived an output voltage which will be proportional to the frequency of the input.

The invention may be more fully understood by reference to the following detailed description of three specific embodiments of the invention as shown in the drawing in which Fig. 1 is a schematic circuit diagram of one embodiment of the invention in a frequency meter;

Figure 1:
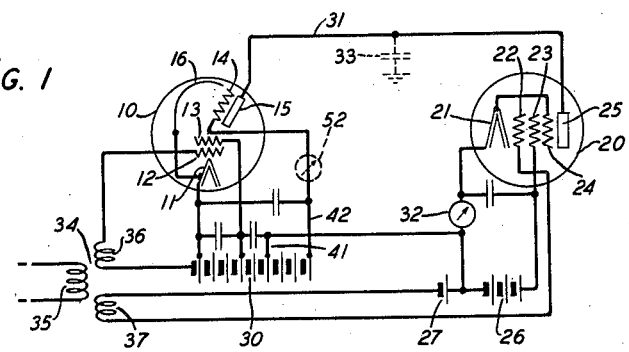

In Fig. 1 there is provided an electron discharge tube 10 of the secondary emission type. This tube is preferably of the construction disclosed in the copending application of A. M. Skellett, Serial No. 321,852 of March 2, 1940. This tube comprises a cathode 11 which serves as a source of primary electrons, a control grid 12, a screen grid 13, a focusing electrode or deflector 16, a collector electrode 14 and a secondary electron emitting anode or plate 15.

In the operation of the tube 10, a flow of primary electrons emitted by the heated cathode 11 is set up due to the positive voltage applied to the screen grid 13. The effect of the deflector 16 acting in conjunction with the other electrodes of the tube is to produce such an electrostatic field as to cause this stream of primary electrons to be deflected and impinge on the secondary emitting anode 15. This anode 15 is positioned out of the straight line path of particles thrown out by the cathode 11 which particles would otherwise contaminate the secondary emitting surface of the anode 15, instead these particles are collected by the deflector 16 while the primary electrons passing through the screen grid 13 are deflected and travel through the collector electrode 14 and strike the anode 15.

The surface of the anode 15 has such properties that when bombarded by these primary electrons it readily emits secondary electrons in a ratio to the primary electrons that is greater than unity. These secondary electrons are attracted by the collector electrode 14 which is maintained at a voltage more positive than the emitter anode 15.

The flow of primary electrons from the cathode 11 is, of course, under control of the voltage of the control grid 12. Consequently, the number of secondary electrons emitted by the emitter anode 15 and flowing to the collector electrode 14 is also under control of the voltage of the control grid 12. If a sufficiently negative voltage is applied to the control grid 12, the flow of both primary and secondary electrons may be blocked.

The circuit also includes a pentode tube 20 of the usual primary emission type comprising a cathode 21, a control grid 22, a screen grid 23, a supressor grid 24, and an anode or plate 25.

The plates 15 and 25 are directly connected together by means of the circuit connection 31. Biasing voltages for the various electrodes of the tubes 10 and 20 are supplied from the batteries 26, 27 and 30. An ammeter 32 is connected in the lead between the cathode 21 and the battery 30. The collector electrode 13 is so connected to the battery 30 that it is at a positive potential with respect to the cathode 21. The dotted condenser 33 represents the combined capacitances to ground of the plates 15 and 25.

Input oscillations are supplied to the primary winding 35 of the input transformer 34. This transformer is also provided with two secondary windings 36 and 37, the secondary winding 36 is connected between the control grid 12 and the cathode 11. This circuit also includes connections to the battery 30 so that the grid 12 is biased negatively at approximately the cut-off point of the tube 10.

The secondary winding 37 is connected between the control grid 22 and the cathode 21. Included in this circuit is the battery 27 by means of which a negative bias is applied to the grid 22 so that the tube 20 is also biased substantially to cut-off. The windings 36 and 37 are so poled that for one-half cycle of the input oscillations supplied to the primary winding 35, the grid 12 will be driven positively with respect to the cathode 11 while during the opposite half cycle the grid 22 will be driven positively with respect to the cathode 21.

In the absence of input oscillations supplied to the winding 35, the space paths of both the tubes 10 and 20 are blocked and no action takes place. When input oscillations are applied to the primary winding 35, the circuit operates as follows: During the half cycle when the control grid 12 is positive the tube 10, including the secondary emission path between the emitter anode 15 and the collector electrode 14 will be conducting. Electrons will therefore flow from the plate 15 to the collector electrode 14 until the plate 15 reaches the potential of the collector electrode 14. It cannot become more positive than the collector electrode since if it did no secondary electron could leave it. During this process the plate 15 and consequently the plate 25, which is directly connected thereto will be raised to a voltage $V_0$ with respect to the cathode 21, where $V_0$ equals the voltage between the taps 41 and 42 on the battery 30. There will therefore collect at the point of common connection of the plates 15 and 25 a charge, $q = V_0(C_1 + C_2)1$ where $C_1$ and $C_2$ are the respective capacitances to ground of the plates 15 and 25 ($C_1 + C_2$ equals the capacitance of condenser 33).

During the next half cycle when the control grid 22 is positive, the space path of the tube 20 which was blocked during the previous half cycle will be conducting. Electrons will therefore flow from the cathode 21 to the plate 25 and the charge $q$ will be drained off.

The current flowing through the circuit averaged over several cycles of the frequency $f$ of the input to the winding 35 will be: $i = V_0(C_1 + C_2)f$.

It will thus be seen that this current is proportional to the frequency of the input voltage and, consequently, the indication given by the meter 32 will also be proportional to the input voltage. However, since the voltage of the anode 15 and 25 is swinging at the frequency of the input voltage, this current will have a component of that frequency. The meter 32 will not respond to variations at such frequencies. However, when the circuit is utilized as a detector of frequency modulated waves precaution must be taken to eliminate such high frequency variations from the output. This will be explained in more detail in connection with consideration of the circuits shown in other figures.

Since the displacement current flows throughout the complete circuit, a meter may be located at points other than shown by the connection to the meter 32, for example, a meter may be located in the connection from the collector electrode 14 to the battery 13 as shown by the dotted meter 52.

Figure 2:
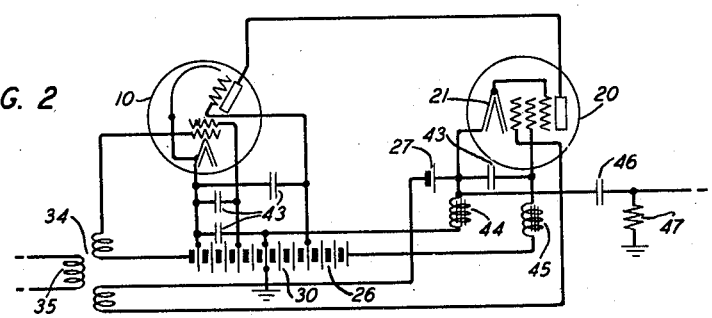
Fig. 2 is a schematic circuit diagram of a second embodiment of the invention particularly adapted for detection of frequency modulated waves.

Fig. 2 shows an embodiment of the invention as particularly adapted for the detection of frequency modulated waves. The circuit of this figure is in general similar to the circuit of Fig. 1 and similar circuit elements are given the same reference numerals. In this circuit the input frequency modulated waves are applied to the transformer primary winding 35, as are the input oscillations of the circuit of Fig. 1. The essential difference between the circuits of the two figures is in the method of deriving the output. This is obtained from the voltage developed across the inductance coil 44 connected between the cathode 21 and the battery 30. This coil 44 has a high impedance at the frequency of the signal or modulations of the frequency modulated waves applied to the primary winding 35. The final output is taken across the resistor 47 which is connected to the coil 44 through the direct current blocking condenser 46. By-pass condensers 43 having low impedance at the frequency of the input wave to the winding 35 and a second choke coil 45 having a high impedance at the output signal frequency are also included in the circuit so that the output voltage across the resistor 47 will be high at the signal frequency and will have the components of the high frequency of the input filtered out.

In this circuit the coils 44 and 45 confine the desired output components to the required paths consequently the batteries 30 and 26 may be combined as shown.

Figure 3A:
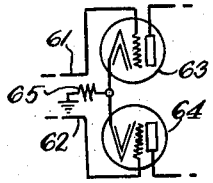
Fig. 3A is a schematic circuit diagram of an amplifier adapted for use with the circuit of Fig. 3.
Figure 3:
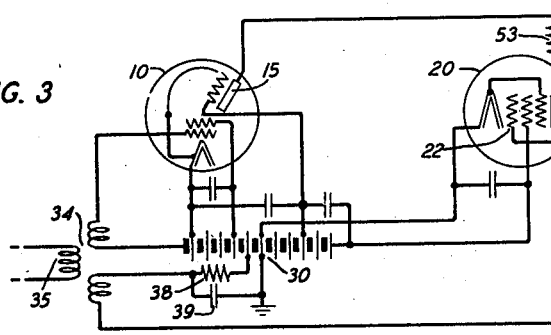
Fig. 3 is a schematic circuit diagram of another embodiment of the invention also particularly adapted for the detection of frequency modulated waves.

Fig. 3 is a second modification of the invention as particularly adapted for the detection of frequency modulated waves. The circuit of this figure, like that of Fig. 2, is in general similar to the circuit of Fig. 1. The difference from the other figures lies in the fact that the output is taken from a resistor 53 through the terminals 61 and 62 connected between the plates 15 and 25. The current through this resistor being the same current which flows in the remainder of the circuit comprising the space path of the tube 20 and the secondary emission path of the tube 10 in series is proportional to the frequencies of the input oscillations supplied to the primary winding 35.

One method of utilizing the voltage developed across the resistor 53 is to connect the terminals 61 and 62 of the resistor to the grids of the tubes of a push-pull amplifier. In such a case it is desirable that the cathodes of the push-pull amplifier have a high impedance to ground so that the plate currents of the tubes 10 and 20 are little affected by the mean potential of the grids of the push-pull amplifier while the difference in potential between the grids is amplified. Fig. 3A shows such a push-pull amplifier. In this circuit the grids of the tubes 63 and 64 are connected through the respective terminals 61 and 62 to the corresponding terminals 61 and 62 of the resistor 53 of Fig. 3. A resistor 65 of relative high resistance is connected between ground and the cathodes of the tubes 63 and 64. The anode circuits of the tubes 63 and 64 may be completed in the conventional manner (not shown).

In the circuit of Fig. 3 the bias voltage for the grid 22 is derived from the battery 30 by means of the grid-leak resistor 38 and by-pass condenser 39.

With the types of circuits shown in Figs. 1 and 2, the plates of the two tubes are at the same potential being directly connected together. Accordingly, the electrodes for the two tubes could be mounted in one envelope using a single element for the two plates. In such a case one surface of such a plate element could be treated to be effective for secondary emission and use as the emitter anode of the secondary emission tube while the untreated surface of the plate is used as the anode of the other tube. Such a structure would provide a capacitance between the common anode point and ground that is considerably lower than with separate tube structures, thus increasing the frequency limit for operation, while in so far as circuit operation is concerned it is the full equivalent of the embodiments of Figs. 1 and 2.

Figure 4:
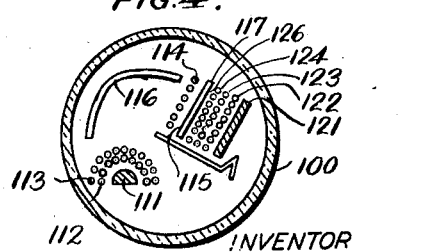
Fig. 4 is a cross-sectional view of a special tube suitable for use in the circuit of the present invention.

A cross section of such a combined tube is shown in Fig. 4. As shown in this figure the electrode structures going to make up both the secondary and primary emission tubes are mounted in a single envelope 100. The secondary emission structure comprises the cathode 111, the control grid 112, the screen grid 113, the deflector 116, the collector electrode 114, and the anode 117 the surface 116 of which is coated with material of such properties as to readily emit secondary electrons. The primary emission structure comprises the cathode 121, the control grid 122, the screen grid 123, the suppressor grid 124 and the anode 117 the surface 126 of which is not treated with secondary emitting material. The anode 117 is common to the two sections through the two surfaces 116 and 126 having the different properties suitable to the operation of the two sections are utilized therein.

Figure 5:
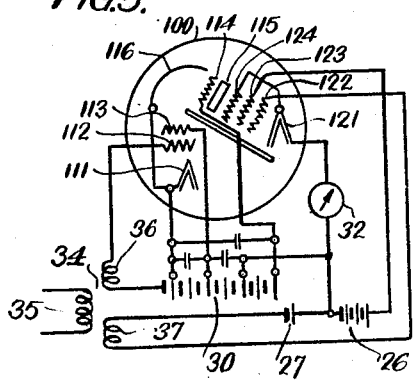
Fig. 5 is a schematic diagram of an embodiment of the invention utilizing the special type of tube shown in Fig. 4.

Fig. 5 shows the method of connecting the tube of Fig. 4 in a circuit of the type of Fig. 1. In this drawing the electrodes in the envelope 100 are given the same reference numerals as in the constructional drawing of Fig. 4 and the circuit elements are given the same reference numerals as the corresponding elements of Fig. 1. This circuit operates in identically the same way as the circuit of Fig. 1. Since one face of the anode 115 corresponds to the anode 15 (of Fig. 1) and the other face corresponds to the anode 25 no external connection such as that of the wire 31 is required. As pointed out previously, this construction permits a much lower capacitance between this point in the circuit and ground than can be readily achieved by the use of separate anode structures. This permits the circuit to be used at higher frequencies.

In the foregoing description the adjustment and operation have been described with both the tubes 10 and 20 biased to cut-off. However, it has been found that with certain tubes and under certain operating conditions a bias which is slightly less than that required for cut-off results in an operation in which the output has a more linear relation to the frequency of the input over a wider range of input frequencies. Such adjustments can be readily determined and it may even be found that the degree of bias may differ for the two tubes of the circuit. In this connection it should be noted that during the half cycle in which the grid of one tube is driven positive that of the other is driven negative and vice versa.

Other modifications of the circuit and operating adjustments thereof will occur to those skilled in the art and may be made without departing from the spirit of the invention as defined in the appended claims.

What is claimed is:

1. A frequency detector comprising a source of input electrical oscillations, an electron emitting cathode, an anode surface, an emitter anode surface, means for directing a stream of primary electrons to said emitter anode surface, a collector electrode for receiving secondary electrons from said emitter anode surface, a source of direct current, a series circuit comprising the electron path between said cathode and said anode surface, a conductive connection between said anode surface and said emitter anode surface, the secondary electron path between said emitter anode surface and said collector electrode and said source of direct current, means responsive to said input oscillations for controlling the electron path between said cathode and said anode surface and the secondary electron path between said emitter anode surface and said collector electrode so that said paths are conducting during alternate half cycles of said input oscillations, and means responsive to the average current in said series circuit.

2. A frequency detector comprising an electron emitting cathode, an anode surface, means for controlling the flow of electrons from said cathode to said anode surface, an emitter anode surface, means for directing a stream of primary electrodes to said emitter anode surface, a collector electrode for receiving secondary electrons from said emitter anode surface, means for controlling the secondary electron stream from said emitter anode surface to said collector electrode, a source of direct current, a series circuit comprising the electron path between said cathode and said anode surface, a conductive connection between said anode surface and said emitter anode surface, the secondary electrode path between said emitter anode surface and said collector electrode and said source of direct current, circuit connections including said means for controlling the flow of electrons from said cathode to said anode surface whereby the electron path between said cathode and anode surface is normally substantially non-conducting, circuit connections including said means for controlling the flow of secondary electrons from said emitter anode surface to said collector electrode whereby the electron path between said emitter anode surface and said collector electrode is normally substantially non-conducting, transformer means for impressing input oscillations on said means for controlling the flow of electrons from said cathode to said anode surface so that the electron path between said cathode and said anode surface is made conductive during one-half cycle of said input oscillations, transformer means for impressing said input oscillations on the means for controlling the flow of secondary electrons from said emitter anode surface to said collector electrode whereby said secondary electron path between said emitter anode surface and said collector electrode is made conducting during the opposite half cycle of said input oscillations, and means responsive to the average current in said series circuit.

3. In a system for producing an output current of amplitude proportional to the frequency of input oscillations, an electron discharge device having a cathode, a control electrode and an anode, a second electron discharge device having a cathode, a control electrode, a secondary emitter electrode and a secondary electron collecting electrode, and means for impressing the input oscillations upon the control electrodes of said discharge devices to render the anode-cathode path of the first device and the secondary electron path between the secondary emitter electrode and the collector electrode of said second device conductive during alternate half cycles of said input oscillations, and an output circuit connected in series with one of said paths of said devices.

4. A system for producing an output current of amplitude proportional to the frequency of input oscillations, an electron emitting cathode, an anode surface, means for controlling the flow of electrons from said cathode to said anode surface, an emitter anode surface, means for directing a stream of primary electrons to said emitter anode surface a collector electrode for receiving secondary electrons from said emitter anode surface, means for controlling said stream of primary electrons to said emitter anode surface whereby the flow of secondary electrons to said collector electrode surface is controlled, a series circuit comprising the electron path between said cathode and anode surface, a conductive connection between said anode surface and said emitter anode surface, the secondary electron path between said emitter anode surface and said collector electrode and said direct current source, means for supplying the input oscillations to said means for controlling the flow of electrons from said cathode to said anode surface and to the means for controlling said stream of primary electrons whereby the electron path between said electron emitting cathode and said anode surface is rendered conductive while the secondary electron path between said emitter anode surface and said collector electrode is rendered non-conductive during one-half cycle of said input oscillations and the secondary electron path between said emitter anode surface and said collector electrode is rendered conductive while the electron path between said cathode and said anode surface is rendered non-conductive during the opposite half cycle of said input oscillations, and an output circuit responsive to the average current in said series circuit.

5. A system according to claim 4 in which the output circuit includes a conductive impedance element connected between said anode surface and said emitter anode surface.

6. In a system for producing an output current of amplitude proportional to the frequency of the input oscillations, an electron discharge device comprising an electron emitting cathode, a plate element with one surface having a low coefficient of secondary electron emission, and a second surface having a high coefficient of secondary electron emission, means for controlling the flow of electrons from said cathode to said one surface, means for directing the stream of primary electrons to said second surface, a collector electrode for receiving secondary electrons from said second surface, means for controlling the flow of said secondary electrons from said second surface to said collector electrode, a source of direct current connected between said cathode and said collector electrode and an output circuit responsive to the average current flowing in the circuit between said cathode and said collector electrodes.

JOHN R. PIERCE.